(12) United States Patent
Paliwal et al.

(10) Patent No.: US 8,843,412 B2
(45) Date of Patent: Sep. 23, 2014

(54) VALIDATING SYSTEM PROPERTY REQUIREMENTS FOR USE OF SOFTWARE APPLICATIONS

(75) Inventors: Bharat Paliwal, Fremont, CA (US); Gaurav Manglik, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2193 days.

(21) Appl. No.: 11/123,476

(22) Filed: May 5, 2005

(65) Prior Publication Data

US 2006/0253402 A1 Nov. 9, 2006

(51) Int. Cl.
*G06F 21/00* (2013.01)
*G06Q 20/40* (2012.01)
*G06F 11/36* (2006.01)

(52) U.S. Cl.
CPC .......... *G06F 11/3664* (2013.01); *G06Q 20/401* (2013.01)
USPC .......................................................... 705/50

(58) Field of Classification Search
USPC .............. 705/50, 16, 21, 59, 71; 380/44, 262, 380/278, 279
See application file for complete search history.

(56) References Cited

U.S. PATENT DOCUMENTS

| | | | |
|---|---|---|---|
| 5,790,667 A * | 8/1998 | Omori et al. | 705/78 |
| 5,896,531 A * | 4/1999 | Curtis et al. | 718/104 |
| 6,374,284 B1 * | 4/2002 | Tadokoro | 718/102 |
| 2005/0038851 A1 * | 2/2005 | Kriegsman | 709/203 |
| 2005/0060345 A1 * | 3/2005 | Doddington | 707/103 Y |
| 2005/0086640 A1 * | 4/2005 | Kolehmainen et al. | 717/120 |
| 2005/0228836 A1 * | 10/2005 | Bacastow et al. | 707/204 |
| 2006/0026463 A1 * | 2/2006 | Paliwal et al. | 714/37 |
| 2006/0037016 A1 * | 2/2006 | Saha et al. | 717/178 |
| 2006/0106838 A1 * | 5/2006 | Ayediran et al. | 707/101 |

* cited by examiner

*Primary Examiner* — Dante Ravetti
(74) *Attorney, Agent, or Firm* — Hickman Palermo Truong Becker Bingham Wong LLP

(57) ABSTRACT

Techniques are described for checking whether system properties meet the requirements of a software application. These checks are performed by executing validation checks associated with the application, which often include validation checks associated with other applications with which the application integrates. A validation engine takes several inputs that drive the validation checking that is performed in conjunction with an operation associated with the application. In one aspect, a modular approach to integrating an application's validation checks with other applications' validation checks is provided via a properties file that contains metadata for all the files in an application's validation module. In another aspect, conditional logic is introduced into a knowledge source so that similar logic does not need to be in the validation test code. In another aspect, the validation test identifiers input is extended to support multiple modes of operations.

21 Claims, 4 Drawing Sheets

VALIDATING SYSTEM PROPERTY REQUIREMENTS FOR USE OF SOFTWARE APPLICATIONS

CROSS REFERENCE TO RELATED APPLICATIONS

This application is related to U.S. patent application Ser. No. 10/901,831 filed by Bharat Paliwal and Debashis Saha on Jul. 28, 2004, entitled "Methods and Systems for Validating a System Environment"; the content of which is incorporated by this reference in its entirety for all purposes as if fully disclosed herein.

FIELD OF THE INVENTION

The present invention relates generally to integration of software applications and, more specifically, to a facilitating framework for integration of heterogeneous application-level validation processes for software applications.

BACKGROUND

Many software applications have system environment requirements that must be fulfilled for the application to execute properly. In a scenario in which one application is to be integrated with another application, such as with integration of a database application with a database management system, the database management system environment must meet the integrated application's system environment requirements in order for the application to function properly. If the system requirements are not met, then the application may not install properly or the application may install but behave unpredictably, possibly resulting in system corruption.

To avoid problems with a system environment, application installation developers may write custom libraries to check for, or validate, system environment properties (e.g., system parameters, OS versions, packages, patches, service packs, etc.) in an automated manner. While avoiding problems that may occur by relying on a user manually performing all of the prerequisite system environment checks ("validation checks") for an application, custom program code may lead to other problems.

For example, validation checks may not be modified, or new checks added, without re-releasing the application and installation modules. Thus, the validation checks that are to be performed in association with a given operation (e.g., an install operation), as well as the reference information on which a validation check relies, are relatively static in nature. Each system property to be validated for a given application has a single fixed value requirement for the application, for checking against the actual system property. For example, a given application may have a requirement for a particular amount of RAM in order to function properly. Additionally, there is no capability for introducing interdependencies between various validation checks.

Furthermore, different sets of validation checks might need to be performed depending on the operation being performed in association with the application. For example, the following may affect the set of checks to perform: (a) whether the operation is being performed on a single stand-alone machine or clustered machines, and (b) whether the operation being performed is an install operation, an upgrade operation, adding languages, etc.

Still further, validation frameworks typically do not scale well and, therefore, fail to adequately support or function well as more and more application products are integrated into a single system, such as when installing interdependent suites of products.

Each of the foregoing desirable features would provide value that is independent of the other desirable features. Furthermore, the approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
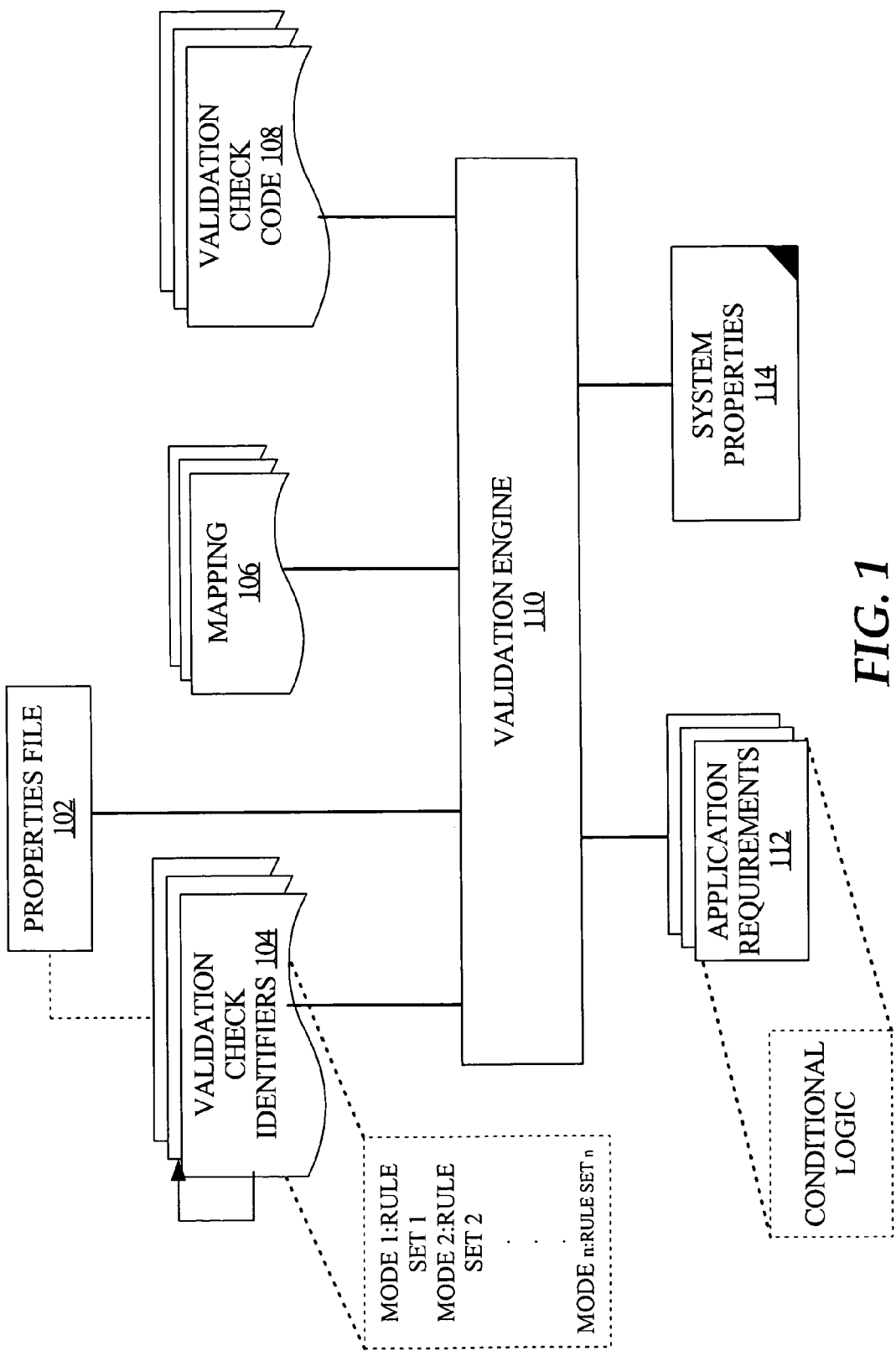
FIG. 1 is a block diagram that illustrates a validation system for validating the properties of a system against the requirements of a software application, according to embodiments of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

FUNCTIONAL OVERVIEW OF EMBODIMENTS OF THE INVENTION

Techniques are described for, generally, checking whether system properties meet the requirements of a software application. Such requirements typically include system hardware requirements (e.g., CPU speed, memory availability, and the like), operating system (OS) requirements (e.g., OS version, OS packages, OS service packs, and the like), and configuration requirements (e.g., swap space, user privileges, etc.). These checks are performed by executing validation checks associated with the application, which often include validation checks associated with other applications with which the application integrates.

Accordingly, a validation check system is described in which a validation engine takes several inputs that "drive" the validation checking that is performed in conjunction with an operation associated with an application. These inputs include validation check identifiers that identify checks of the system that need to be performed, associated code that embodies the validation checks, and "knowledge sources" from which the validation engine obtains the application requirements and the system properties that need to be compared in order to validate that the system properties meet the application's requirements. The architecture of the system provides a flexible and extensible validation platform for integrating applications and suites of applications, such as integrating a database application suite with a database management system.

In one aspect of the invention, a modular approach to integrating an application's validation checks with other applications' validation checks is provided via a properties file that contains metadata for all the files in the system. The properties file is extended to support multiple input files of a given type (e.g., a type file for each integrated application). Therefore, a validation engine is capable of recognizing from the properties file that input is coming from several sources of the same type of input. Consequently, a primary application validation module only needs to include the primary application's input files, with references (e.g., pointers) in the properties file to any integrated applications' validation input files. Thus, the primary application developer is not required to rework the files to manually integrate the integrated applications' validation modules. Furthermore, integration of multiple applications' validation modules occurs at the metadata level, without requiring changes to the underlying input files, which are pluggable into the validation system.

In another aspect of the invention, conditional logic is introduced into a knowledge source so that similar logic does not need to be in the validation test code. Consequently, the knowledge source is dynamic in nature and can be used to direct the validation engine as to which validation checks to execute, or what parameters to input to a particular validation check.

In another aspect of the invention, the validation test identifiers input is extended to support multiple modes of operation. Consequently, different rule sets (comprising a set of validation checks and associated validation check code) can be developed for different modes, integrated with each other, and exposed in the validation check identifiers input file. Because the validation check identifiers input is the processing entry point to the actual validation checks performed by the validation engine, the validation check identifiers are used to dictate which validation checks to perform for a given mode of operation. Thus, depending on what product, what type of operation (e.g., install versus update), and what type of system environment (e.g., stand-alone versus cluster) a user selects, validation engine can determine what is the appropriate subset of validation checks to invoke, based on information in the appropriate validation test identifiers input.

These techniques can be used, for a non-limiting example, in the context of managing a computing grid on which a wide variety of applications execute, often in an integrated manner. For each application, a set of validations for respective modes of operation can be easily integrated into a single composite validation system used to manage validation processes for applications on the grid. The validation system is used to ensure that the systems and platforms on which each application executes meet the minimum requirements for a given operation associated with a corresponding application, and can scale concurrent with the growing demands on the grid.

FIG. 1 is a block diagram that illustrates a validation system for validating the properties of a system against the requirements of a software application, according to embodiments of the invention.

Validation Module for an Application

A validation module is constructed for each application for which the validation engine 110 is to be used for performing system requirements checks. A validation module can be constructed in association with numerous types of operations, for non-limiting examples, software application installation and updating, and database creation. A validation module can be constructed with respect to numerous types of system environment requirements, such as software, hardware, and network requirements. A validation module comprises one or more validation check identifiers 104, one or more mappings 106, one or more validation check code 108, and one or more application requirements 112 and system properties 114 knowledge sources.

Validation Check Identifiers 104

Each validation check identifiers 104 identifies the validation checks that are to be executed in order to validate the system environment properties against the application's requirements. A validation check identifier 104 may be in the form of a file, such as an XML file, that lists the appropriate checks to perform to validate the system environment in conjunction with performing an operation associated with the application. Such operations may include, for non-limiting examples, an application install operation, an application upgrade operation, adding languages to an application, and the like. The operation being performed typically dictates what validation checks need to be performed. Furthermore, each operation may have an associated mode, such as stand-alone mode and cluster mode, which also may dictate what validation checks need to be performed.

Mappings 106 and Validation Check Code 108

Each mapping 106 is a mapping (e.g., a table) of validation check identifiers to validation check code. Thus, for a given application validation module, mapping 106 maps each validation check identifier listed in validation check identifiers 104 to corresponding validation check code 108. Validation check code 108 is the executable code which, when executed by one or more processors, performs the validation checks that check whether or not the system environment properties meet the application's system requirements. Each validation check code 108 may, in implementations, contain respective programming code (i.e., one or more sequences of instructions) for each respective validation check listed in validation check identifiers 104, and information as to how to invoke the code.

Application Requirements 112 and System
Properties 114 Knowledge Sources

As described in U.S. patent application Ser. No. 10/901,831, validation engine (also referred to as a "rules engine") resolves validation check identifiers 104 to corresponding validation check code 108 via mapping 106, and executes the corresponding check code with parameter input from corresponding application requirements 112 and/or system properties 114 knowledge sources. One example of a knowledge source may be system properties 114 having information on the actual host system for which the system environment is being verified (e.g., the host system on which the application is to be installed). Non-limiting examples of host system information may include available memory, total memory, CPU speed, page/swap size, device capabilities, operating system version, operating system packages installed, applications installed, or other types of host system environment information.

Another type of knowledge source, such as application requirements 112, may be reference information for the application. For example, application requirements 112 may be created for each of the system platforms for which the application has different system environment requirements. Non-limiting examples of system platform knowledge source information may include total/available memory needed by the application to execute on the system platform, operating system version and packages needed by the application to run properly on the system platform, system platform configuration requirements, and other types of information specifying the system platform requirements of the application.

Modular Integration of Validation Checks

Often, to perform an operation for a "primary" application (for a non-limiting example, installing an application that accesses a database), the primary application's validation checks must be executed as well as certain validation checks for the "integrated" application, i.e., the application with which the application is integrating (e.g., the database server). In other words, the system environment properties are validated to ensure that both the primary application's requirements and at least some of the integrated application's system requirements are met. Furthermore, sometimes both the primary application and the integrated application(s) may be installed together as a package.

With past approaches, the primary application developer would require knowledge of the integrated application's system requirements and associated validation checks. The developer was required to manually integrate the integrated application's requirements and checks into the primary application's validation module, by including the integrated application's requirements in an associated knowledge source and including the integrated application's checks in the validation test identifiers 104, mapping 106 and validation check code 108 files for the application. This type of manual integration is labor-intensive and may be prone to error, especially in view of the numerous possible states of numerous products with which the primary application is being integrated (e.g., product A runs on top of product B, which runs on top of product C) and with which the primary application should be compatible. In addition, when the integrated application changes or the integrated application's requirements change, then the primary application's validation module would require updating to reflect these changes.

Properties File 102

In one embodiment, a modular approach to integrating an application's validation checks with other applications' validation checks, is provided via a properties file 102. The manner in which properties file 102 is implemented may vary. For example, a properties file 102 could be implemented to contain metadata for all the component resources (e.g., files, code, etc.) of a single corresponding validation module, or could be implemented to contain metadata for all the component resources (e.g., files, code, etc.) of multiple corresponding validation modules.

The capabilities of properties file 102 is extended to support configuration and management of multiple files of a given type (e.g., a type file for each integrated application), such as respective validation test identifiers 104, mapping 106, and validation check code 108 for respective applications. Properties file 102 also supports multiple instances of a given type of knowledge source (e.g., knowledge sources for each integrated application), such as respective reference host knowledge sources, application platform requirement knowledge sources, and the like. Therefore, validation engine 110 is capable of recognizing, from properties file 102, that input is coming from several sources of the same type of input.

Consequently, a primary application validation module only needs to include the primary application's input files, with references (e.g., pointers) to any integrated applications' validation input files in the properties file 102. Thus, there is one file of a given type for the primary application and one file of the given type for each integrated application, and the primary application developer is not required to rework the files to manually integrate the integrated applications' validation modules. Furthermore, integration of multiple applications' validation modules occurs at the properties file 102 level, i.e., at the metadata level, without requiring changes to the underlying input files, such as the validation check identifiers 104, mappings 106, and validation check code 108 input files. These files are pluggable into the validation system, with corresponding references and metadata in the properties file 102.

Validation engine 110 processes validation modules based on the configuration of the modules in properties file 102. In scenarios in which properties file 102 is used to include metadata about the primary application's input files and pointers to any integrated applications' files, validation engine 110 effectively generates a union of validation checks based on the order of the file references in properties file 102. In one embodiment, files that are referenced in properties file 102 before other files preempt, or override, the latter-referenced files. Hence, validation engine 110 resolves the ordering of validation checks without ambiguity, based on the corresponding ordering of file references within properties file 102. Validation engine 110 ignores duplicate validation check identifiers (e.g., duplicate validation check names that correspond to respective application validation modules) and corresponding validation check code associated with later-referenced validation files or modules.

The described functionality provides modular integration of validation checks, which results in the validation system being significantly more scalable in that numerous validation modules for different applications can readily be plugged into the validation system. Furthermore, interdependent applications which require interdependent validation checks, can be easily integrated with each other and easily integrated into the validation system, without requiring knowledge of the content of, or reworking of, an interdependent validation module. As described, such integration is simple in that the properties file 102 is configurable to reference and to order validation module components of interdependent applications. Thus, a developer can develop validation methods for a particular application and expose those methods to the validation system and to users of the validation system via properties file 102.

A Process for Validating a System Environment

Figure 2:
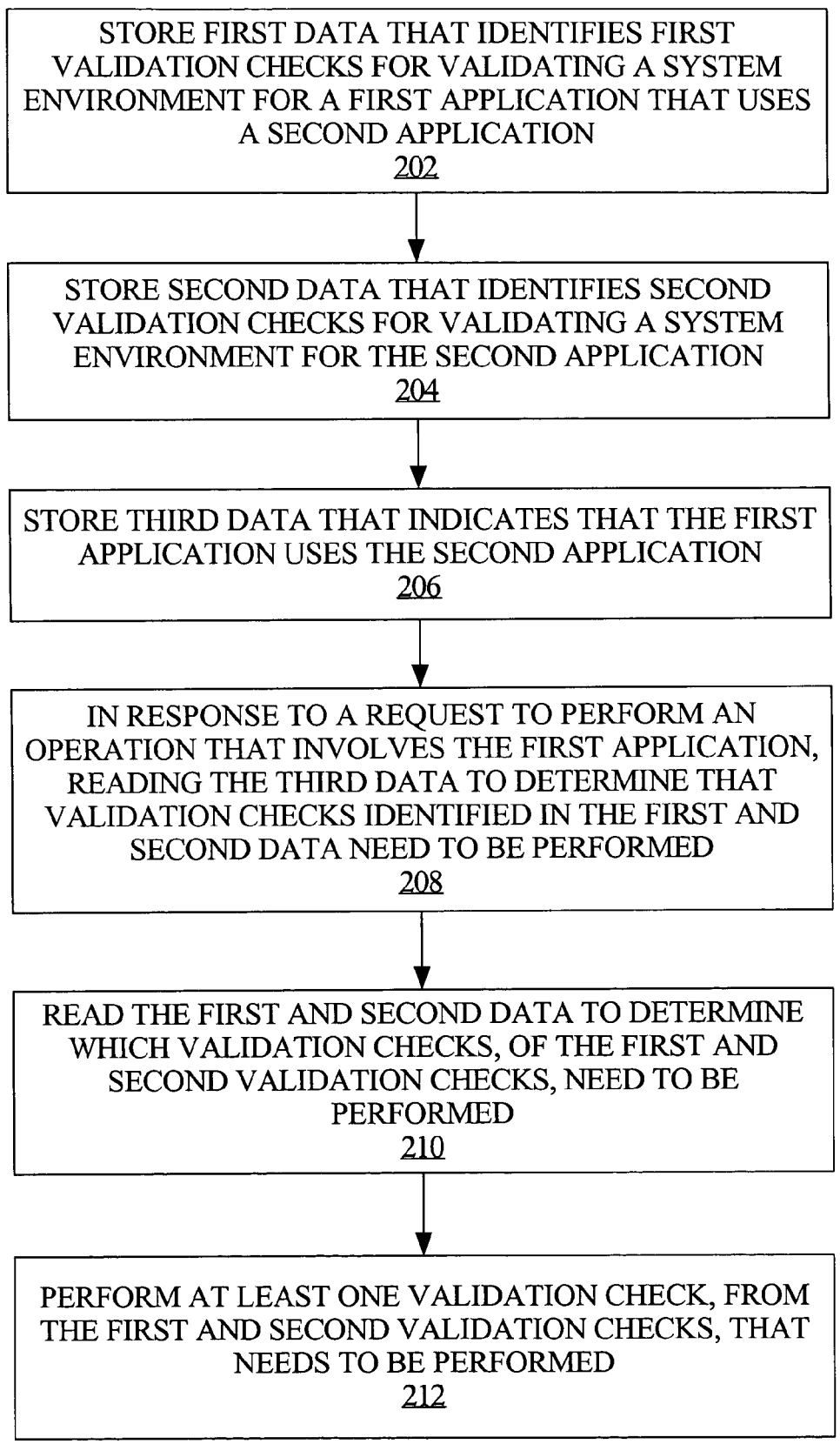
FIG. 2 is a flow diagram that illustrates a process for validating a system environment for an application, according to an embodiment of the invention.

FIG. 2 is a flow diagram that illustrates a process for validating a system environment for an application, according to an embodiment of the invention. In one embodiment, the process of FIG. 2 is performed by executing one or more sequences of instructions that cause one or more processors to perform the described actions, such as processors 404 of computer system 400 of FIG. 4.

At block 202, first data is stored. The first data identifies first validation checks for validating a system environment for a first application, which uses a second application. At block 204, second data is stored. The second data identifies second validation checks for validating a system environment for a second application. For a non-limiting example, validation check identifiers 104 (FIG. 1) are stored in computer system memory in association with a corresponding application server and validation check identifiers 104 are stored in association with a corresponding database server that the application server uses for executing database operations on data in a database. The example of the integration of an application server with a database server is continued herein for purposes of an example only, and in no way limits the context in which the techniques described herein may be implemented. Furthermore, not all embodiments of the invention are necessarily in the context of validating system properties against multiple applications' requirements.

At block 206, third data is stored. The third data indicates that the first application uses the second application. For example, properties file 102 (FIG. 1) is stored in computer system memory in association with a corresponding application, such as the application server of the ongoing example. In the properties file 102 are metadata about the corresponding data files, etc., as well as the pointers (or other similarly functioning referencing mechanism) to the data files, etc. for the integrated application(s).

At block 208, the third data is read in response to a request to perform an operation that involves the first application. The third data is read in order to determine that the validation checks for the first and second application need to be performed. For example, the properties file 102 for the application server is read and interpreted by validation engine 110 (FIG. 1) to determine that both the application server's and the database server's validation checks need to be executed. Validation engine determines that the database server's validation checks need to be executed based on the pointer to the database server's validation module components.

After determining that the validation checks for the first and second applications need to be performed in order to validate the system properties in view of the applications' requirements, at block 210, the first and second data are read to determine which specific validation checks need to be performed. For example, validation engine 110 reads the validation check identifiers 104 for each of the application server and database server, identifies validation checks for each server, and uses the corresponding mappings 106 (FIG. 1) to identify corresponding validation check code 108 (FIG. 1).

At block 212, at least one of the validation checks, from the first and second validation checks, is performed to validate that the applications' requirements are met by the system. For example, validation engine 110 executes appropriate validation check code 108, in conjunction with input from application requirements 112 (FIG. 1) and system properties 114 (i.e., relevant knowledge sources) as described in U.S. patent application Ser. No. 10/901,831.

Conditional Logic for Validation Checks

Some validation checks benefit from condition evaluation and satisfaction logic. For example, a set of validation checks for a given application may include a validation check that compares operating system package versions (i.e., the functionality or components of different versions) because errors or bugs in the application were found when the application executes on top of a particular version of an OS. A corresponding validation check may be directed to check for complicated ranges of system properties. For example, the application whose system requirements are being validated may require a version of an OS greater than version 10.2.1 and less than version 10.5, excluding version 10.4.9 (an interim version between the upper and lower version boundaries). With past approaches, implementation of complicated system requirement ranges would require hard-coded coding of the validation check code 108 in order to support range-based conditions. Maintaining hard-coded requirement ranges in the validation code itself is not an ideal approach.

Some validation checks require the results of one check in order to drive another check. For example, one validation check may check for available total memory. Based on the results of that validation check, performance of one of several other validation checks is required. For example, such logic may include the following: if available memory is between X and Y (based on a validation check a), then run validation check b, otherwise run validation check c. For another example, such logic may include the following: if available memory is between X and Y (based on a validation check a), then run validation check b with parameter m; if available memory is between Y and Z (based on a validation check a), then run validation check b with parameter n; and so on.

In one embodiment, conditional logic is introduced into a knowledge source so that similar logic does not need to be in the validation test code. For example, application requirements 112 may contain conditional logic so that similar logic is not required in validation test code 108. Consequently, the knowledge source is dynamic in nature and can be used to direct the validation engine 110 as to which validation checks to execute, or what parameters to input to a particular validation check. A non-limiting example of a use of this feature is in the context of post-production (i.e., after release of an application product) exceptions, when an incompatibility is discovered between an OS and application installed on top of the OS. Rather than requiring validation code changes, one can simply provide a customer a new knowledge source (e.g., an XML file) of application requirements 112 with the exceptions built into conditional logic within the knowledge source, or inform the customer to modify the existing knowledge source to account for the exceptions.

With past approaches having a static reference model (i.e., no conditional logic on top of the validation check code), a change in a validation check algorithm and/or validation check parameters required (a) change to the validation check source code (i.e., validation check code 108); (b) building of binaries; and (c) shipping the binaries to the user. As mentioned, with the new technique described herein, such changes can be implemented simply by modifying a knowledge source, such as an input XML file, and providing the modified knowledge source to the user. This technique simplifies and significantly enhances the turnaround time for fixing issues with the application or its validation module in a post-production context. In addition, a data file change is less prone to error than modified validation code.

Mode Support for Validation Checks

Different modes of operation, with respect to the application operation being performed in conjunction with the validation, may expose different application functionalities and, therefore, require different subsets of validation checks based on the mode. For example, different validation checks may be required depending on the system environment in which the application operation is performed, such as when installing an application on a stand-alone machine as opposed to installing the application on a cluster of machines. Further, different validation checks are typically required depending on what kind of application operation is performed, such as whether the application is being installed, updated, languages added, etc. Therefore, a validation system that readily supports multi-mode validation checks is beneficial.

In one embodiment, the validation check identifiers 104 file is extended to support multiple modes of operation. Consequently, different rule sets (comprising a set of validation checks and associated validation check code) can be developed for different modes, integrated, and exposed in the validation check identifiers 104 file. That is, in a validation check identifiers 104 file for a given application, one rule set comprising a subset of validation checks can be associated with one mode of operation, and another rule set comprising a different subset of validation checks can be associated with a different mode of operation. Likewise, mapping 106 maps the validation check identifiers 104 for a given rule set to the corresponding validation check code 108 which, when executed, performs the corresponding validation checks of the system environment that need to be performed for the associated mode of operation.

Because the validation check identifiers 104 files are the processing entry points to the actual validation checks performed by validation engine 110, the validation check identifiers are used to dictate which validation checks to perform for a given mode of operation. Thus, depending on what product, what type of operation (e.g., install versus update), and what type of system environment (e.g., stand-alone versus cluster) a user selects, validation engine 110 can determine what is the appropriate subset of validation checks to invoke, based on information in the appropriate validation test identifiers 104 input.

In one embodiment, a default chain of subsets of validation checks can be implemented using the properties file 102. For example, a generalized order of different subsets of validation checks can be specified in the properties file 102, from which validation engine 110 can traverse the chain in order to identify and locate the appropriate validation checks to execute for a given application and mode. Thus, if a dominant (i.e., higher in the order of priority) subset of validation checks specified in the chain in the properties file 102 for a particular mode is not found in the corresponding validation check identifiers 104, then validation engine 110 can move to the next available subset in the chain and process that subset of validation checks.

A Process for Validating a System Environment

Figure 3:
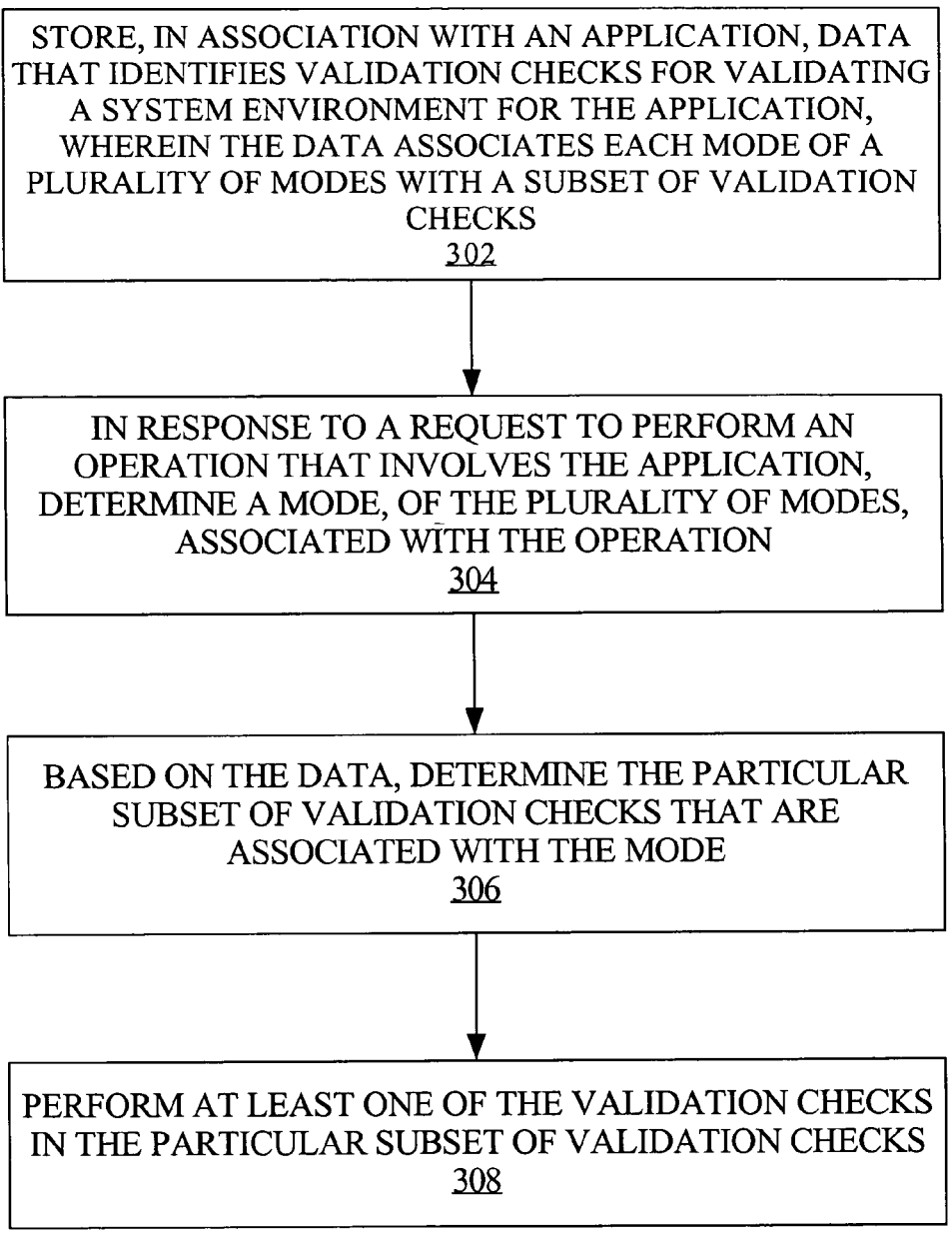
FIG. 3 is a flow diagram that illustrates a process for validating a system environment for an application, according to an embodiment of the invention.

FIG. 3 is a flow diagram that illustrates a process for validating a system environment for an application, according to an embodiment of the invention. In one embodiment, the process of FIG. 3 is performed by executing one or more sequences of instructions that cause one or more processors to perform the described actions, such as processors 404 of computer system 400 of FIG. 4.

At block 302, data is stored in association with an application. The data identifies validation checks for validating a system environment for the application. For a non-limiting example, validation check identifiers 104 (FIG. 1) are stored in computer system memory in association with a corresponding application server. The data associates each mode of a plurality of modes with a set of validation checks, or with a set of rules that identify or reference corresponding validation checks. For example, a particular set of checks are mapped, in validation check identifiers 104 (FIG. 1), to corresponding modes. Generally, the sets of validation checks are not necessarily mutually exclusive because different sets may contain one or more common validation checks.

The term "mode" is used here in a general context. In one embodiment, a mode corresponds to the system environment in which the application will execute, such as whether the application operation is performed on an application that will execute on a stand-alone machine or on multiple machines that function together, such as in a cluster and/or grid environment. In another embodiment, a mode corresponds to the type of operation being performed on the application, for non-limiting examples, an install operation, update operation, adding languages, and the like.

At block 304, the particular mode that is associated with an operation that involves the application is determined in response to a request to perform the operation. For example, in response to a request to install the application server on a clustered node, validation engine 110 (FIG. 1) determines, from the request, that the requested operation is a cluster-based install operation.

At block 306, the particular subset of validation checks that are associated with the mode is determined based on the data. For example, validation engine 110 reads validation check identifiers 104 (FIG. 1) and, based on the requested mode, determines the particular subset of validation checks that need to be performed in association with a cluster-based install operation for the application server.

At block 308, at least one of the validation checks in the particular subset of validation checks is performed to validate that the applications' requirements are met by the system. For example, validation engine 110 executes appropriate validation check code 108 FIG. 1), in conjunction with input from application requirements 112 (FIG. 1) and system properties 114 (i.e., relevant knowledge sources) as described in U.S. patent application Ser. No. 10/901,831.

Hardware Overview

Figure 4:
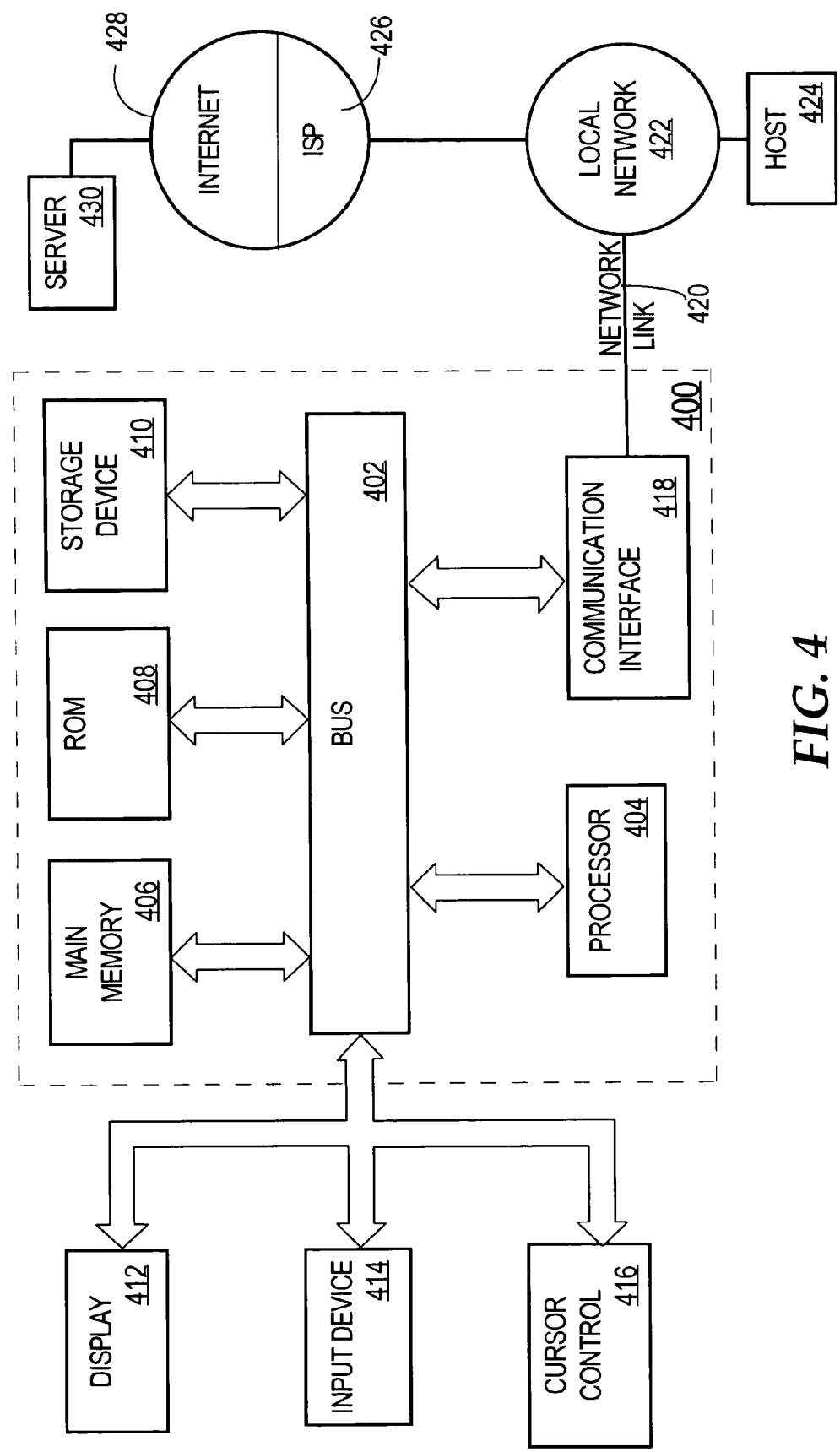
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   storing, by a computer processor, on a computer-readable storage medium, a first file that identifies first validation checks;
   storing, by the computer processor, on a computer-readable storage medium, a second file that is separate from the first file and that identifies second validation checks;
   storing, by the computer processor, on a computer-readable storage medium, a third file that is separate from the first and second file;
   inserting in the third file, by the computer processor, a first reference to the first file and a second reference to the second file;
   performing, by the computer processor, a validation check identified in the first file by following the first reference to the first file;
   performing, by the computer processor, a validation check identified in the second file by following the second reference to the second file;
   determining, by the computer processor, based at least in part on results of performing the validation check identified in the first file, whether a system environment is valid for a first application; and
   determining, by the computer processor, based at least in part on results of performing the validation check identified in the second file, whether a system environment is valid for a second application.

2. The method of claim 1, further comprising:
- determining that the third file contains the first reference to the first file before the second reference to the second file;
- based on the determination that the third file contains the first reference before the second reference, performing a validation check that is identified by a validation check identifier that is indicated in both the first file and the second file.

3. The method of claim 1, further comprising:
- determining, by the computer processor, a request to perform an operation that involves the first application;
- based on determining the request to perform an operation that involves the first application, performing the steps of;
- selecting, from a plurality of modes including modes not associated with the operation, a particular mode associated with the operation;
- determining a particular subset of validation checks that the first file associates with the particular mode; and
- based on determining that the first file associates the particular subset of validation checks with the particular mode, performing at least one of the validation checks in the particular subset of validation checks.

4. The method of claim 3, wherein at least one of the modes corresponds to the system environment in which the application will execute.

5. The method of claim 3, wherein at least one of the modes corresponds to an operation performed on the application.

6. The method of claim 1, further comprising:
- performing a first validation check that produces a first result; and
- based on the first result, performing a second validation check.

7. The method of claim 6, further comprising:
- selecting a parameter value for the second validation check based on the first result; and performing the second validation check using the parameter value.

8. A computer-implemented method comprising:
- associating, by a computer processor, a first mode of a plurality of modes with a first subset of a set of validation checks;
- storing, by the computer processor, on a computer-readable storage medium, and in association with an application data that associates the first mode of the plurality of modes with the first subset of a set of the validation checks;
- associating, by the computer processor, a second mode of a plurality of modes with a second subset of a set of the validation checks that differs from the first subset;
- storing, by the computer processor, on a computer-readable storage medium, and in association with the application, data that associates the second mode of the plurality of modes with the second subset of the set of validation checks;
- receiving, by the computer processor, a request operation;
- determining, by the computer processor, a particular mode of the plurality of modes, associated with the requested operation;
- selecting, by the computer processor, from the first and second subsets, a particular subset of validation checks that the data associates with the particular mode; and
- performing, by the computer processor, at least one of the validation checks in the particular subset of validation checks.

9. The method of claim 8, wherein at least one of the modes corresponds to the system environment in which the application will execute.

10. The method of claim 9, wherein the system environment in which the application will execute is associated with a stand-alone computer.

11. The method of claim 9, wherein the system environment in which the application will execute is associated with a plurality of computers that operate together as peers.

12. The method of claim 8, wherein at least one of the modes corresponds to an operation performed on the application.

13. A non-transitory computer-readable storage that stores instructions which, when executed by one or more processors, cause the one or more processors to perform the steps of:
- storing on a computer-readable storage medium, a first file that identifies first validation checks;
- storing on a computer-readable storage medium, a second file that is separate from the first file and that identifies second validation checks;
- storing on a computer-readable storage medium, a third file that is separate from the first and second file;
- inserting in the third file a first reference to the first file and a second reference to the second file;
- performing a validation check identified in the second file by following the second reference to the second file;
- determining based at least in part on results of performing the validation check identified in the first file, whether a system environment is valid for a first application; and
- determining based at least in part on results of performing the validation check identified in the second file, whether a system environment is valid for a second application.

14. The non-transitory computer-readable storage of claim 13, wherein the steps further comprise:
- determining that the third file contains the first reference to the first file before the second reference to the second file; based on the determination that the third file contains the first reference before the second reference, performing a validation check that is identified by a validation check identifier that is indicated in both the first file and the second file.

15. The non-transitory computer-readable storage of claim 13, said steps further comprising:
- determining, by the computer processor, a request to perform an operation that involves the first application;
- based on determining the request to perform an operation that involves the first application, performing the steps of selecting, from a plurality of modes including modes not associated with the operation, a particular mode associated with the operation;
- determining a particular subset of validation checks that the first file associates with the particular mode; and
- based on determining that the first file associates the particular subset of validation checks with the particular mode;
- performing at least one of the validation checks in the particular subset of validation checks.

16. The non-transitory computer-readable storage of claim 15, wherein at least one of the modes corresponds to the system environment in which the application will execute.

17. The non-transitory computer-readable storage of claim 15, wherein at least one of the modes corresponds to an operation performed on the application.

18. The non-transitory computer-readable storage of claim 13, said steps comprising:

performing a first validation check that produces a first result; and based on the first result, performing a second validation check.

19. The non-transitory computer-readable storage of claim 18, said steps comprising:

selecting the second validation check based on the first result.

20. The non-transitory computer-readable storage of claim 18, said steps comprising:

selecting a parameter value for the second validation check based on the first result; and performing the second validation check using the parameter value.

21. A non-transitory computer-readable storage that stores instructions which, when executed by one or more processors, cause the one or more processors to perform the steps of:

associating a first mode of a plurality of modes with a first subset of a set of the validation checks;

storing on a computer-readable storage medium, and in association with an application, data that associates the first mode of the plurality of modes with the first subset of a set of the validation checks;

associating a second mode of a plurality of modes with a second subset of a set of the validation checks that differs from the first subset;

storing on a computer-readable storage medium, and in association with the application, data that associates the second mode of the plurality of modes with the second subset of the set of validation checks;

receiving a request operation;

determining a particular mode, of the plurality of modes, associated with the requested operation;

selecting from the first and second subsets, a particular subset of validation checks that the data associates with the particular mode; and performing at least one of the validation checks in the particular subset of validation checks.

* * * * *

UNITED STATES PATENT AND TRADEMARK OFFICE
CERTIFICATE OF CORRECTION

PATENT NO. : 8,843,412 B2  
APPLICATION NO. : 11/123476  
DATED : September 23, 2014  
INVENTOR(S) : Paliwal et al.

Page 1 of 1

It is certified that error appears in the above-identified patent and that said Letters Patent is hereby corrected as shown below:

In the Claims

In column 13, lines 14-15, in Claim 3, delete "steps of;" and insert -- steps of: --, therefor.

In column 13, line 43, in Claim 8, delete "set of" and insert -- set of the --, therefor.

In column 13, lines 46-47, in Claim 8, delete "application" and insert -- application, --, therefor.

In column 13, line 59, in Claim 8, delete "mode" and insert -- mode, --, therefor.

In column 14, lines 24-25, in Claim 13, delete "inserting in the third file a first reference to the first file and a second reference to the second file;" and insert -- inserting in the third file a first reference to the first file and a second reference to the second file; performing a validation check identified in the first file by following the first reference to the first file --, therefor.

Signed and Sealed this
Twenty-eighth Day of April, 2015

Michelle K. Lee
*Director of the United States Patent and Trademark Office*